United States Patent
Ghielmi et al.

(10) Patent No.: US 8,536,237 B2
(45) Date of Patent: Sep. 17, 2013

(54) IONOMERIC MEMBRANE

(75) Inventors: Alessandro Ghielmi, Milan (IT); Paola Vaccarono, Milan (IT); Vincenzo Arcella, Milan (IT)

(73) Assignee: Solvay Solexis S.p.A., Milan (IT)

( * ) Notice: Subject to any disclaimer, the term of this patent is extended or adjusted under 35 U.S.C. 154(b) by 1819 days.

(21) Appl. No.: 11/374,467

(22) Filed: Mar. 14, 2006

(65) Prior Publication Data

US 2006/0223894 A1    Oct. 5, 2006

(30) Foreign Application Priority Data

Mar. 17, 2005  (IT) ............... MI2005A000444

(51) Int. Cl.
  *C08J 5/20*  (2006.01)
(52) U.S. Cl.
  USPC .............. 521/27; 526/249; 526/250; 526/255
(58) Field of Classification Search
  USPC ..................... 521/27; 526/249, 250, 255
  See application file for complete search history.

(56) References Cited

U.S. PATENT DOCUMENTS

| | | | |
|---|---|---|---|
| 2,242,218 A | 5/1941 | Auer | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,358,545 A | 11/1982 | Ezzell et al. | |
| 4,433,082 A * | 2/1984 | Grot | 524/544 |
| 4,610,762 A | 9/1986 | Birdwell | |
| 4,666,468 A | 5/1987 | Wu | |
| 4,940,525 A * | 7/1990 | Ezzell et al. | 204/252 |
| 5,082,472 A * | 1/1992 | Mallouk et al. | 95/49 |
| 5,173,553 A | 12/1992 | Albano et al. | |
| 2004/0158014 A1 * | 8/2004 | Wlassics et al. | 526/252 |
| 2006/0223894 A1 * | 10/2006 | Ghielmi et al. | 521/27 |

FOREIGN PATENT DOCUMENTS

| | | |
|---|---|---|
| EP | 0 148 482 A2 | 7/1985 |
| EP | 0 239 123 A1 | 9/1987 |
| EP | 1 004 615 A2 | 5/2000 |
| EP | 1 238 999 A | 9/2002 |
| EP | 1238999 A1 * | 9/2002 |
| EP | 1 285 688 A | 2/2003 |
| EP | 1285688 A1 * | 2/2003 |
| EP | 1 535 935 A1 | 6/2005 |
| EP | 1535935 A1 * | 6/2005 |
| EP | 1702668 A1 * | 9/2006 |
| EP | 1702670 A1 * | 9/2006 |

OTHER PUBLICATIONS

Japanese Office Action dated Aug. 23, 2011 (and English translation) issued in corresponding Japanese Patent Application No: 2006-071397.

* cited by examiner

*Primary Examiner* — Peter D. Mulcahy
*Assistant Examiner* — Henry Hu
(74) *Attorney, Agent, or Firm* — Arent Fox LLP

(57) ABSTRACT

An ionomeric membrane formed of a sulphonic (per)fluorinated ionomer wherein the sulphonic groups are at the end of short side chains (SSC), said ionomer having:
  equivalent weight between 700 and 1600 g/eq;
  side chains of formula: $-O-CF_2-CF_2-SO_3^-M^+$, wherein M is hydrogen or an alkaline metal;
said membrane having the following combination of properties:
  size variations, for both the orthogonal directions xy of the plane, lower than 15%, measured after dipping of the ionomeric membrane, dried at 105° C. under vacuum for one hour, in demineralized water at 100° C. for 30 minutes;
  the membrane, dipped at the temperature of 50° C. for 22 hours in a water/ethanol mixture containing 40% by weight of alcohol, remains integral.

8 Claims, No Drawings

IONOMERIC MEMBRANE

This nonprovisional application claims the benefit of Italian Application No. MI2005 A 000444, filed Mar. 17, 2005. The disclosure of the prior application is hearby incorporated herein in it's entirety by reference.

The present invention relates to membranes, to be used in electrochemical cells, preferably fuel cells, comprising (per) fluorinated ionomers where the sulphonic groups are at the end of short side chains (SSC), and having reduced size variations in the two orthogonal directions xy in the plane, lower than 15%, more preferably lower than 10%.

Besides the membranes of the present invention have a good physical stability according to the following test: the membranes having dimensions 12 cm×20 cm, dipped for 22 hours at the temperature of 50° C. in a water/ethanol mixture containing 40% by weight of alcohol, remain integral. This means that the membranes, at the end of the test, remain a single piece and no fragments are formed.

The ionomers obtained from sulphonic monomers having short side chain (SSC) are known in the prior art. See for example U.S. Pat. No. 4,358,545 and U.S. Pat. No. 4,940,525. The side chains of said (per)fluorinated ionomers have general formula, see U.S. Pat. No. 4,940,525, of the type —O—$CFR_{If}$)$_{bI}$—$(CF_2)_{aI}SO_2Z_I$, wherein:

$Z_I$ can have various meanings, among them halogen;

aI and bI are integer numbers ranging from 0 to 2, with the proviso that a+b is different from zero;

$R_{If}$ is selected from F, Cl, $C_1$-$C_{10}$ perfluoroalkyl or chlorofluoroalkyl.

When $Z_I$ is halogen, for example fluorine, the sulphonylfluoride groups —$SO_2F$ are convertible into sulphonic groups —$SO_3H$ by hydrolysis. U.S. Pat. No. 4,610,762 describes membranes containing groups convertible into ion exchanger groups, for example by transformation of the —$SO_2F$ groups into —$SO_3H$. The method for preparing the membranes of this patent consists in forming a film on a support by starting from a polymer dispersion in a dispersing solvent, having boiling point lower than 110° C. and density from about 1.55 to 2.97 g/cm³. After application of the dispersion, the dispersant is removed and, then, on the support a treatment at temperatures from about 150° C. to about 380° C. depending on the polymer thermoplastic properties, is carried out. In this example of this patent said process is illustrated for a copolymer TFE/$CF_2$=CF—O—$(CF_2)_2COOCH_3$, wherein, in the final thermal treatment, the copolymer is melted on an aluminum sheet to form a coating. According to this Example, first a copolymer TFE/$CF_2$=CF—O—$(CF_2)_2SO_2F$ is prepared, then it is extruded, and the obtained film adhered under pressure to an aluminum sheet coated with the copolymer TFE/$CF_2$=CF—O—$(CF_2)_2COOCH_3$. The aluminum sheet is removed and the obtained film is hydrolyzed to form acid functional groups —$SO_3H$. The membrane size stability is not even mentioned in this piece of prior art. U.S. Pat. No. 4,666,648 describes the preparation of a membrane by casting of a polymer in solution or dispersion on a surface of a substrate. The support can be formed of a material, dissolved after the final film has been dried, or a material having a low surface energy. After the deposit of the polymer in solution or dispersion on the support, drying is carried out, preferably, at temperatures lower than 110° C. Nothing is said on the membrane size stability in this patent. Besides, tests carried out by the Applicant have shown that the membranes prepared according to this process do not pass the above described physical stability test. Therefore the duration of these membranes in electrochemical cells is limited.

The need was felt to have available ionomeric membranes comprising (per)fluorinated ionomers with sulphonic groups at the end of short side chains (SSC), having reduced size variations in the two orthogonal directions xy of the plane, i.e. lower than 15%, and contemporaneously remaining integral after having been subjected to the stability test in hydroalcoholic solution as above.

The Applicant has found ionomeric membranes solving the above technical problem.

An object of the present invention is ionomeric membranes formed of a sulphonic (per) fluorinated ionomer with sulphonic groups at the end of short side chains (SSC), having:

equivalent weight from 700 and 1,600 g/eq, preferably from 750 to 1,200 g/eq;

side chains of formula: —O—$CF_2$—$CF_2$—$SO_3^-M^+$, wherein M is hydrogen or an alkaline metal;

size variations, in both orthogonal directions xy of the plane, lower than 15%, more preferably lower than 10%, measured after dipping of the ionomeric membrane, having dimensions 12 cm×20 cm, dried at 105° C. under vacuum for one hour, in demineralized water at 100° C. for 30 minutes;

remaining integral after dipping at the temperature of 50° C. for 22 hours in a water/ethanol mixture containing 40% by weight of alcohol (membrane dimensions: 12 cm×20 cm). The membranes of the present invention are obtainable with the process described hereunder.

The (per) fluorinated ionomers usable for preparing the membranes of the present invention are obtainable from ionomers having the following units:

(A) monomeric units deriving from one or more fluorinated monomers containing at least one ethylenic unsaturation;

(B) fluorinated monomeric units containing —$SO_2F$ groups having formula $CF_2$=CF—O—$CF_2CF_2SO_2F$, in amounts such that the ionomer has the equivalent weight in the above range; by hydrolysis of the —$SO_2F$ groups to obtain the —$SO_3H$ groups. The fluorinated monomers (A) are selected from:

vinylidene fluoride (VDF);

$C_2$-$C_8$ perfluoroolefins, preferably tetrafluoroethylene (TFE);

$C_2$-$C_8$ chloro- and/or bromo- and/or iodo-fluoroolefins, as chlorotrifluoroethylene (CTFE) and bromotrifluoroethylene;

$CF_2$=$CFOR_{f1}$ (per) fluoroalkylvinylethers (PAVE), wherein $R_{f1}$ is a $C_1$-$C_6$ (per) fluoroalkyl, for example trifluoromethyl, bromodifluoromethyl, pentafluoropropyl;

$CF_2$=CFOX perfluoro-oxyalkylvinylethers, wherein X is a $C_1$-$C_{12}$ perfluoro-oxyalkyl having one or more ether groups, for example perfluoro-2-propoxy-propyl.

Optionally the sulphonic fluorinated ionomers of the invention can contain from 0.01% to 2% by moles of monomeric units deriving from a bis-olefin of formula:

$$R_1R_2C=CH-(CF_2)_m-CH=CR_5R_6 \qquad (I)$$

wherein:
m=2-10, preferably 4-8;
$R_1$, $R_2$, $R_5$, $R_6$, equal to or different from each other, are H or $C_1$-$C_5$ alkyl groups.

Preferably the membranes of the present invention contain TFE as monomer (A)

The hydrolysis treatment of the ionomers containing the precursor group of the sulphonic groups comprises two steps; the first is carried out in basic environment and the second in acid environment, obtaining the ionomers with functional groups in the acid form —$SO_3H$.

The sulphonyl precursor groups —SO$_2$F can be transformed into sulphonic groups —SO$_3$H by the following steps:

salification of the —SO$_2$F form into the —SO$_3^-$Me$^+$ form, where Me is an alkaline metal;

acidification of the —SO$_3^-$Me$^+$ form into the —SO$_3$H form.

The first step can for example be carried out by mixing the ionomeric polymer with an aqueous solution containing 10% by weight of KOH, at a temperature between 60° C. and 80° C., for a time higher than 2 hours, until disappearance of the —SO$_2$F groups (IR analysis) and formation of the —SO$_3^-$Me$^+$ group. At the end of the salification step, the ionomer is washed with water at a temperature preferably not higher than 25° C. The acidification step is carried out, for example, by transferring the salified ionomer into an aqueous solution containing 20% by weight of HCl at room temperature and by keeping under stirring for at least half an hour. At the end washing with water is carried out according to the above method.

Monomer (B) can be prepared according to the process described in U.S. Pat. No. 3,560,568.

The membranes according to the present invention have a thickness ranging from 5 micrometers to 500 micrometers, preferably from 10 to 200 micrometers, still more preferably from 15 to 60 micrometers.

A further object of the present invention is a process for preparing the membrane of the present invention, said process comprising the following steps:

1) preparation of a liquid dispersion comprising a (per)fluorinated ionomer as defined above, in acid or salified form, wherein the ionomer concentration is, in per cent by weight, between 0.5% and 40%, preferably between 0.5% and 25%;

2) deposit of the dispersion obtained in 1) on a surface of a support to form a layer or film, the support being inert under the conditions used in the process of the present invention;

3) optional removal of the solvent for at least 80% by weight, preferably for at least 90%, still more preferably for at least 95% by weight with respect to the initial solvent of the dispersion, obtaining a raw membrane on the support;

4) annealing at temperatures from 130° to 280° C., preferably from 140° to 180° C., obtaining the membrane on the support;

5) detachment of the membrane from the support.

Inert support means a material substantially remaining chemically and physically unchanged under the conditions used for preparing the membrane.

In step 1) preparation of a liquid dispersion comprising a (per) fluorinated ionomer, the solvent is selected from C$_1$-C$_3$, preferably C$_3$, alcohols, n-propanol and/or iso-propanol; or from mixtures, preferably with water, of said C$_1$-C$_3$ alcohols. During the preparation other organic solvents can also be used, in addition to the above solvents, provided that they are miscible with water and/or with the above alcohols. Examples of said optional solvents are the following: dimethyl sulphoxide (DMSO), ethylen glycol (EG), N,N'-dimethylformamide (DMF), triethyl phosphate (TEP), 2-ethoxyethanol (2EE), N,N'-dimethylacetamide (DMA), N-methylpyrrolidone (NMP), aceto-nitrile (AN) and propylencarbonate (PC), fluoropolyoxyalkenes having one hydrogen atom at one or at both the chain ends; the fluoropolyoxyalkenes preferably have boiling point between 80° C. and 120° C.

The ionomer in solutions and/or dispersions are known in the prior art. See for example EP 1,004,615 and U.S. Pat. No. 4,433,082.

In step 2) the deposit of the polymer in solution or dispersion is carried out with the known methods of the prior art; for example it can be carried out by brush coating, dip coating, spray coating, casting with knife, kiss-coating, serigraphy, ink-jetting, curtain coating, etc.

In step 2) the inert support can be of any type, preferably non porous and preferably with smooth surfaces, and having size variations in each of the two directions xy of the plane, measured at the temperature of step 4) for 15 minutes not higher than 2%, preferably not higher than 1%. Preferably the support shows mechanical properties substantially unchanged during the thermal treatment of the process. For example the support can be one of the following: non porous PTFE, polyimide, in particular marketed with the trademark Kapton®, MFA, PFA, polyesters such as PET.

In step 3) the solvent removal is generally carried out by operating at temperatures from 25° C. to 95° C., preferably at atmospheric pressure, until obtaining a residual solvent content in the above limits. For example, by operating at a temperature of 65° C., a time of 30-45 minutes is necessary to remove the solvent. In step 3) the solvent removal can optionally be carried out by gradually increasing the temperature up to that used in the final thermal treatment step 4).

The thermal treatment in step 4) is carried out for a time generally higher than 15 minutes and preferably lower than 10 hours. Generally the higher the temperature, the lower the treatment times.

In step 5) the detachment of the membrane from the surface of the support is carried out with the methods known in the prior art, for example by dry operating, or by dipping in water, generally at room temperature (25° C.).

It has been unexpectedly and surprisingly found by the Applicant that the membranes obtainable with the process of the present invention show more limited size variations in the two orthogonal directions xy of the plane in comparison with the membranes having the same ionomer composition but prepared by extrusion.

The preparation of the ionomers used for preparing the membranes of the present invention can be carried out by a mass, suspension, emulsion radical polymerization process. The aqueous emulsion or microemulsion polymerization can for example be mentioned. The surfactants usable in these polymerizations are (per) fluorinated, for example salts (as defined below) of the perfluorooctanoic, perfluorononanoic, perfluorodecanoic acid, or their mixtures, etc., (per) fluoropolyethers with an acid end group (for example COOH, SO$_3$H), salified with NH$_4^+$ or with alkaline metal cations, the other end group being (per)fluorinated, optionally containing one H or Cl atom. The number average molecular weights of the perfluoropolyether surfactants generally range from 300 to 1,800, preferably from 350 to 750.

The microemulsion polymerization is well known in the art.

In particular the ionomer preparation is carried out by using an aqueous emulsion wherein, in the reaction medium, as surfactants, those of formula:

R$_f$—X$_1^-$M$^+$ are used, wherein:

X$_1$ is equal to —COO, —SO$_3$;

M is selected from H, NH$_4$ or an alkaline metal;

R$_f$ represents a (per)fluoropolyether chain, preferably having number average molecular weight in the range from about 230 to about 1,800, preferably from 300 to 750, said (per)fluoropolyether chain comprising repeating units selected from one or more of the following:
a) —($C_3F_6O$)—;
b) —($CF_2CF_2O$)—;
c) —($CFL_0O$)—, wherein $L_0$=—F, —$CF_3$;
d) —$CF_2(CF_2)_{z'}CF_2O$—, wherein z' is an integer 1 or 2;
e) —$CH_2CF_2CF_2O$—.

$R_f$ is monofunctional and has a (per) fluorooxyalkyl end group T, for example $CF_3O$—, $C_2F_5O$—, $C_3F_7O$—; optionally in perfluoroalkyl end groups one fluorine atom can be substituted with one chlorine or hydrogen atom. Examples of these end groups are $Cl(C_3F_6O)$—, $H(C_3F_6O)$—. The unit a) $C_3F_6O$ is —$CF_2$—$CF(CF_3)O$— or —$CF(CF_3)$ $CF_2O$—.

The aqueous emulsion polymerization is well known in the art.

In the above formula $R_f$ preferably has one of the following structures:
1) T—$(CF_2O)_a$—$(CF_2CF_2O)_b$—$CF_2$—
   b, a being integers,
   with b/a between 0.3 and 10 when a is different from 0, extremes included, a being an integer different from 0;
2) T—$(CF_2$—$(CF_2)_{z'}$—$CF_2O)_{b'}$—$CF_2$—
   b', and z' being integers,
   wherein z' is an integer equal to 1 or 2;
3) T—$(C_3F_6O)_r$—$(C_2F_4O)_b$—$(CFL_0O)_t$—$CF_2$—
   r, b, t, being integers,
   with r/b ranging from 0.5 to 2.0, when b is different from 0;
   (r+b)/t ranges from 10 to 30, when t is different from 0;
a, b, b', r, t are integers, their sum is such that $R_f$ has the above values of number average molecular weight.

The compounds wherein $R_f$ has the following formula:

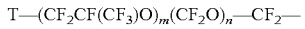

T—$(CF_2CF(CF_3)O)_m(CF_2O)_n$—$CF_2$— are still more preferred,
m, n being integers;
m/n ranges from 1 to 30;
wherein T=—$OCF_3$ or —$OCF_2Cl$.

The (per) fluoropolyethers $R_f$ are obtainable with the known processes of the prior art, see for example the following patents herein incorporated by reference: U.S. Pat. No. 3,665,041, U.S. Pat. No. 2,242,218, U.S. Pat. No. 3,715,378 and the European patent 239,123. The fluoropolyethers functionalized with hydroxyl termination are obtained for example according to EP 148,482, U.S. Pat. No. 3,810,874, from which the end functional groups are obtained with the processes indicated herein.

Chain transfer agents can be used in the polymerization. For example alkaline or earth-alkaline metal iodides and/or bromides, according to U.S. Pat. No. 5,173,553. Preferably chain transfer agents containing hydrogen, as hydrocarbons, alcohols, in particular ethyl acetate and ethane are used.

The polymerization initiators used in the process of the present invention are preferably radical inorganic initiators, as for example ammonium and/or potassium and/or sodium persulphate, optionally in combination with ferrous, cuprous or silver salts. The procedures of the initiator feeding into the polymerization reactor can be in a continuous way or by a single addition at the beginning of the polymerization.

The polymerization reaction is generally carried out at temperatures in the range 25° C.-70° C., preferably 50° C.-60° C., under pressure up to 30 bar (3 MPa), preferably higher than 8 bar (0.8 MPa).

The monomer (B) is fed into the poylmerization reactor in a continuous way of by steps.

After the polymerization is completed, the ionomer is isolated by conventional methods, as the coagulation by addition of electrolytes or by freezing.

As said, the membranes of the present invention are usable in electrochemical cells, in particular in fuel cells.

The following Examples are given for illustrative and not limitative purposes of the present invention.

EXAMPLES

Characterization

Equivalent Weight Determination

About 1 gram of the polymer is dried at 150° C. for 40 h. From the dried powder a thin film of about 100 μm is obtained by molding in press at the temperature of 280° C. The so obtained film is treated at 80° C. for 24 h with KOH at 10% by weight, then washed with demineralized water and then treated at room temperature for 24 h with HCl at 20% by weight. At the end it is washed with demineralized water. In this way the sulphonyl groups of the film are converted into acid sulphonic groups.

The polymer film in acid form is dried at 105° C. up to a constant weight and weighed: then the film is suspended in a hydroalcoholic or an aqueous solution, an excess of a titrated NaOH solution is added and it is titrated back with a HCl titrated solution. The equivalent weight is determined by the ratio between the weight of the film, expressed in grams, and the number of equivalents of titrated acid groups.

Determination of the Size Variations of the Membrane

The membrane is cut so that its area is square.

The membrane is initially dried at 105° C. under vacuum for 1 hour. The membrane sizes are determined. The membrane is then hydrated in demineralized water at 100° C. for 30 minutes; after removal from water the membrane sizes are determined.

The size variations in the two orthogonal directions are calculated as percent referred to the initial sizes, after drying at 105° C. under vacuum for 1 hour.

Physical Stability Test of the Membrane in Hydroalcoholic Solution at 50° C.

The physical stability of the membrane is determined by dipping in a water/ethanol mixture containing 40% by weight of alcohol at the temperature of 50° C. After 22 h the final appearance of the membrane is observed.

Determination of the Dispersion Viscosity

The viscosity (Brookfield) is determined by a viscometer Synchro Electric® LVT model, measured at 25° C. with rotor No. 4 at 60 rpm.

Example 1

Ionomer Preparation in $SO_3H$ Form

In a 22 litre autoclave the following reactants are introduced:
11.5 litres of demineralized water;
980 g of the monomer of formula $CF_2$=CF—O—$CF_2CF_2$—$SO_2F$;
3,100 g of an aqueous solution at 5% by weight of a fluoropolyoxyalkylene having acid end group with number average molecular weight 521 potassium salified, of formula:

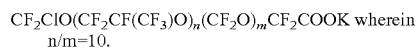

$CF_2ClO(CF_2CF(CF_3)O)_n(CF_2O)_mCF_2COOK$ wherein n/m=10.

The autoclave, kept under stirring at 540 rpm, is heated to 60° C. Then 225 ml of an aqueous solution having a concentration of 6 g/l of potassium persulphate (KPS) are fed into the autoclave. The pressure is brought to 1.3 MPa absolute by introducing TFE. The reaction starts after 4 min. The pressure is maintained at 1.3 MPa absolute by feeding TFE. After 1,000 g of TFE have been fed into the reactor, 175 g of the sulphonic monomer of formula $CF_2=CF-O-CF_2-CF_2-SO_2F$ are introduced. Then 175 g of the same sulphonic monomer are introduced in the reactor every 200 g of TFE fed. The total TFE mass fed to the reactor is 4,000 g.

The reaction is stopped after 233 min by interrupting the TFE feeding, cooling and venting the reactor under vacuum. The produced latex has a solid content of 28.5% by weight. The latex is coagulated by freezing and defrosting, the polymer separated from the mother liquors, washed with water up to a constant pH of the washing waters.

The equivalent weight of the copolymer is 870 g/eq, corresponding to a composition 85.5% molar of TFE and 14.5% molar of sulphonic monomer.

A part of the polymer is separated from the washing waters and is treated with a 20% by weight KOH solution at 80° C. for 6 hours, by keeping under stirring. For one part by weight of polymer 10 parts by weight of KOH solution are charged. At the end it is washed with demineralized water up to stable pH of the washing waters. 10 parts by volume are added for one part by weight of polymer of a 20% HCl solution, maintaining under stirring at room T for 2 h. At the end it is washed with demineralized water up to stable pH of the washing waters. The addition steps of the HCl solution and of the subsequent washing with water are repeated for other two times. At the end the polymer in the $SO_3H$ form is recovered and dried for 40 h at 80° C.

Example 2

Preparation of the Ionomer Dispersion

An 8.6% by weight dispersion of the sulphonic ionomer obtained in the Example 1 is prepared by dissolving 18.8 g of ionomer in 200 g of a quaternary mixture composed of 39 g of $H_2O$, 80 g of isopropanol, 80 g of n-propanol and 1 g of a fluoropolyoxyalkylene having formula:

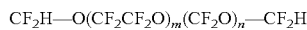

$CF_2H-O(CF_2CF_2O)_m(CF_2O)_n-CF_2H$ with boiling range between 80° C. and 120° C. and number average molecular weight equal to 350. The dissolution is carried out at room temperature in 24 hours in a glass vessel equipped with mechanical stirrer. At the end the dispersion has a Brookfield viscosity, determined by a viscometer Synchro Electric® LVT model, measured at 25° C. with rotor No. 4 at 60 rpm, of 1000 cP.

Example 3

Preparation of the Ionomeric Membrane

The ionomeric membrane is prepared by depositing on a Kapton support having a thickness of 50 μm a strip of the dispersion prepared in the Example 2, having a length of about 10 cm. By means of a stratifying Braive® knife, set at knife height 700 μm, the dispersion is dragged so as to form a continuous liquid layer. It is dried in a stove at 65° C. for 30 minutes by evaporating most of the solvent. In this way the raw monomeric membrane is formed placed on the Kapton support.

The annealing step is carried out by transferring into a stove at 150° C. for 3.5 hours the membrane on the Kapton support. At the end it is extracted from the oven and the Kapton support is removed from the ionomeric membrane by dipping in water. The membrane was then cut to obtain sheets having dimensions 12 cm×20 cm.

Example 3a

Size Variations of the Membrane of the Example 3

The membrane obtained in the Example 3 is subjected to the above test to determine the size variations in the two orthogonal directions xy of the plane. At the end of the test it is found that the size variations in the two orthogonal directions are 8% for each direction of the plane.

Example 3b

Physical Stability Test of the Membrane of the Example 3

After 22 hours it is observed that the membrane is undamaged and shows the same physical properties as at the beginning of the experiment. Therefore the membrane has remained integral.

Example 4 (Comparative)

The Example 3 is repeated but by detaching the membrane from the support and by carrying out the final annealing treatment on the membrane detached from the support. A membrane not flat and showing a non uniform thickness is obtained.

Example 4a (Comparative)

The size variations are higher than 20%.

Example 4b (Comparative)

Physical Stability Test of the Membrane of the Example 4 (Comparative)

The test is carried out and it is found that after 22 hours the membrane has broken to pieces.

Example 5 (Comparative)

Preparation of the Ionomeric Membrane by Extrusion

A part of the polymer in the $SO_2F$ form of the Example 1 is dried at 150° C. for 40 h and subjected to extrusion at 245° C. by Braebender extruder to obtain granules. Then the granules are extruded at 250° C., obtaining a film having a 30 μm thickness.

A part of the obtained film is treated at 80° C. for 24 h with KOH at 10% by weight, then washed with demineralized water and then treated at room temperature for 24 h with HCl at 20% by weight. At the end it is washed in demineralized water. In this way the sulphonyl groups of the film are converted into acid sulphonic groups. The membrane was then cut into sheets having dimensions 12 cm×20 cm.

Example 5a (Comparative)

Size Variations of the Membrane of the Example 5 (Comparative)

The membrane obtained in the Example 5 (comparative) is subjected to the above test to determine the size variations in the two orthogonal directions xy of the plane. At the end of the test it is found that the size variation in the transversal direction y is 18%, that in the longitudinal direction x is 8%.

Example 6 (Comparative)

A membrane is prepared by using the process of the Example 3 but carrying out the final thermal treatment at the temperature of 110° C.

Example 6b (Comparative)

Physical Stability Test of the Membrane of the Example 6 (Comparative)

The test is carried out and it is found that after 22 hours the membrane is almost completely dissolved in the hydroalcoholic solvent.

The invention claimed is:

1. An ionomeric membrane formed of a sulphonic fluorinated ionomer comprising
side chains of formula: $—O—CF_2—CF_2—SO_3^-M^+$, wherein M is hydrogen or an alkaline metal,
wherein the sulphonic fluorinated ionomer has an equivalent weight from 700 to 1,600 g/eq,
wherein size variations in the ionomeric membrane in both orthogonal directions of the xy plane are lower than 15% measured after drying the membrane under vacuum for one hour at 105° C. and dipping the ionomeric membrane in demineralized water at 100° C. for 30 minutes,
wherein the ionomeric membrane remains integral after dipping in a water/ethanol mixture containing 40% by weight of alcohol at a temperature of 50° C. for 22 hours, and
wherein the ionomeric membrane is prepared by a process comprising the following steps:
1) preparing a liquid dispersion comprising a fluorinated ionomer in acid or salified form;
2) depositing the dispersion on a surface of a non-porous support to form a layer or film, wherein the support is inert under the process conditions;
3) optional removal of at least 80% by weight of a solvent in the dispersion with respect to the initial solvent in the dispersion to obtain a raw membrane on the support;
4) performing thermal treatment on the raw membrane and the support at temperatures from 130° to 280° C. to obtain the membrane on the support; and
5) detaching the membrane from the support.

2. The ionomeric membrane according to claim 1, wherein the sulphonic fluorinated ionomers usable for preparing the membranes are obtained from ionomers having the following units:
(A) monomeric units derived from one or more fluorinated monomers containing at least one ethylenic unsaturation; and
(B) fluorinated monomeric units containing $—SO_2F$ groups having formula $CF_2=CF—O—CF_2CF_2SO_2F$, in amounts such that the ionomer has the equivalent weight in the range of claim 1;
by hydrolysis of the $—SO_2F$ groups to obtain the $—SO_3H$ groups.

3. The ionomeric membrane according to claim 2, wherein the ionomers contain TFE as monomer (A).

4. The ionomeric membrane according to claim 2, wherein the fluorinated monomers (A) are selected from:
vinylidene fluoride (VDF);
$C_2$-$C_8$ perfluoroolefins;
$C_2$-$C_8$ chloro- and/or bromo- and/or iodo-fluoroolefins;
$CF_2=CFOR_{f1}$ (per) fluoroalkylvinylethers (PAVE), wherein $R_{f1}$ is a $C_1$-$C_6$ (per) fluoroalkyl;
$CF_2=CFOX$ perfluoro-oxyalkylvinylethers, wherein X is a $C_1$-$C_{12}$ perfluoro-oxyalkyl having one or more ether groups.

5. The ionomeric membrane according to claim 4, wherein the $C_2$-$C_8$ perfluoroolefin is tetrafluoroethylene (TEE).

6. The ionomeric membrane according to claim 1, wherein the sulphonic fluorinated ionomer further comprises from 0.01% to 2% by moles of monomeric units deriving from a bis-olefin of formula:

$$R_1R_2C=CH—(CF_2)_m—CH=CR_5R_6 \qquad (I)$$

wherein:
m=2-10;
$R_1$, $R_2$, $R_5$, $R_6$, equal to or different from each other, are H or $C_1$-$C_5$ alkyl groups.

7. The ionomeric membrane according to claim 1, wherein the sulphonic per (fluorinated) ionomer has an equivalent weight from 750 to 1,200 g/eq.

8. The ionomeric membrane according to claim 1, wherein the ionomeric membrane has size variations of lower than 10% in both orthogonal directions of the xy plane.

* * * * *